US006659259B2

(12) United States Patent
Knox et al.

(10) Patent No.: US 6,659,259 B2
(45) Date of Patent: Dec. 9, 2003

(54) MULTIPLE DENOMINATION CURRENCY RECEIVING AND PREPAID CARD DISPENSING METHOD AND APPARATUS

(75) Inventors: David Knox, Point Roberts, WA (US); Josh Emanuel, Wayne, NJ (US)

(73) Assignee: DataWave Systems, Inc., Vancouver (CA)

( * ) Notice: Subject to any disclaimer, the term of this patent is extended or adjusted under 35 U.S.C. 154(b) by 72 days.

(21) Appl. No.: 09/939,940

(22) Filed: Aug. 27, 2001

(65) Prior Publication Data

US 2002/0179401 A1 Dec. 5, 2002

Related U.S. Application Data

(60) Provisional application No. 60/295,439, filed on Jun. 1, 2001.

(51) Int. Cl.[7] .......................... G06F 19/00; G06F 17/60
(52) U.S. Cl. ...................... 194/217; 194/215; 235/379
(58) Field of Search ............................... 194/217, 216, 194/210, 211; 235/379, 380, 375

(56) References Cited

U.S. PATENT DOCUMENTS

| | | | |
|---|---|---|---|
| 5,293,310 A | 3/1994 | Carroll et al. ............... 364/408 |
| 5,440,108 A | 8/1995 | Tran et al. ................... 235/381 |
| 5,513,102 A | 4/1996 | Auriemma ................... 364/408 |
| 5,620,079 A | 4/1997 | Molbak ....................... 194/217 |
| 5,659,165 A | * 8/1997 | Jennings et al. ............. 235/379 |
| 5,696,908 A | 12/1997 | Muehlberger et al. ....... 395/239 |
| 5,834,756 A | 11/1998 | Gutman et al. .............. 235/493 |
| 5,869,826 A | 2/1999 | Eleftheriou ................. 235/380 |
| 6,073,744 A | 6/2000 | Raterman et al. ........... 194/207 |
| 6,105,009 A | 8/2000 | Cuervo ......................... 705/43 |
| 6,167,387 A | 12/2000 | Lee-Wai-Yin ................ 705/41 |
| 6,205,433 B1 | * 3/2001 | Boesch et al. ................ 705/26 |
| 2002/0153415 A1 | * 10/2002 | Minami et al. ............. 235/380 |

* cited by examiner

Primary Examiner—Donald P. Walsh
Assistant Examiner—Mark J Beauchaine
(74) Attorney, Agent, or Firm—Jon A. Gibbons; Fleit, Kain, Gibbons, Gutman, Bongini & Bianco P.L.

(57) ABSTRACT

A method and system and computer readable medium for processing currency including cash, coins, passive cards, prepaid cards, debit cards, check cards, and smart cards and for providing tokens including passive cards, debit cards, check cards, and smart cards. A transaction fee is calculated based upon a combination of one more of the following (i) type and amount of currency deposited; (iii) the type and amount of token requested; and (iii) the type and amount of the subsequent purchase.

48 Claims, 7 Drawing Sheets

FIG. 4A

DEPOSIT TRANSACTION FEES 400

| CURRENCY TYPE | STRAIGHT 404 |
|---|---|
| U.S. BILLS | FEE 100 |
| U.S. COINS | FEE 105 |
| CASH CARD A | FEE 200 |
| CASH CARD B | FEE 201 |
| ... | ... |
| CASH CARD N | FEE 203 |
| CREDIT CARD A | FEE 405 |
| CREDIT CARD B | FEE 407 |
| ... | ... |
| CREDIT CARD N | FEE 407 |
| SMART CARD A | FEE 440 |
| SMART CARD B | FEE 440 |
| ... | ... |
| SMART CARD N | FEE 412 |
| RECEIPT A | FEE 537 |
| RECEIPT B | FEE 537 |
| ... | ... |
| RECEIPT N | FEE 537 |
| CANADIAN BILLS | FEE 666 |
| CANADIAN COINS | FEE 667 |
| ... | ... |

FIG. 4B

DEPOSIT TRANSACTION FEES & DISCOUNTS

| CURRENCY TYPE | STRAIGHT 404 | DISCOUNT 1 406 | DISCOUNT 1 408 | DISCOUNT 1 410 | ... | DISCOUNT N 412 |
|---|---|---|---|---|---|---|
| U.S. ONE DOLLAR BILLS | FEE 100 | 0.25 | 0.10 | ... | 0.20 |
| U.S. FIVE DOLLAR BILLS | FEE 105 | 0.25 | 0.12 | ... | 0.22 |
| U.S. TEN DOLLAR BILLS | FEE 107 | 0.75 | 0.12 | ... | 0.12 |
| U.S. TWENTY DOLLAR BILLS | FEE 107 | 0.75 | 0.23 | ... | 0.22 |
| U.S. FIFTY DOLLAR BILLS | FEE 107 | 0.75 | 0.8 | ... | 0.20 |
| CASH CARD A | FEE 200 | 0.5 | 0.5 | ... | 0.20 |
| CASH CARD B | FEE 201 | 0.45 | 0.24 | ... | 0.24 |
| ... | ... | ... | ... | ... | ... |
| CASH CARD N | FEE 203 | 0.16 | 0.33 | ... | 0.28 |
| CREDIT CARD A | FEE 405 | 0.27 | 0.37 | ... | 0.32 |
| CREDIT CARD B | FEE 407 | 0.27 | 0.25 | ... | 0.22 |
| ... | ... | ... | ... | ... | ... |
| CREDIT CARD N | FEE 407 | 0.35 | 0.30 | ... | 0.25 |
| SMART CARD A | FEE 440 | 0.24 | 0.30 | ... | 0.23 |
| SMART CARD B | FEE 440 | 0.25 | 0.21 | ... | 0.20 |
| ... | ... | ... | ... | ... | ... |
| SMART CARD N | FEE 412 | 0.18 | 0.20 | ... | 0.20 |
| RECEIPT A | FEE 537 | 0.15 | 0.17 | ... | 0.22 |
| RECEIPT B | FEE 537 | 0.12 | 0.12 | ... | 0.24 |
| ... | ... | ... | ... | ... | ... |
| RECEIPT N | FEE 537 | 0.17 | 0.14 | ... | 0.22 |
| CANADIAN ONE DOLLAR BILLS | FEE 666 | 0.34 | 0.30 | ... | ... |
| CANADIAN TEN DOLLAR BILLS | FEE 667 | 0.34 | 0.34 | ... | 0.25 |
| ... | ... | ... | ... | ... | ... |

DISPENSING TOKEN TRANSACTION FEES
500

| TOKEN TYPE | RECHARGE | STRAIGHT |
|---|---|---|
| CASH CARD A | FEE 700 | FEE 230 |
| SMART CARD B | FEE 702 | FEE 485 |
| ... | ... | ... |
| RECEIPT A | FEE 711 | FEE 532 |
| ... | ... | ... |
| RECEIPT N | FEE 755 | FEE 541 |
| ... | ... | ... |

DISPENSING TOKEN TRANSACTION FEES & DISCOUNT FEES

| TOKEN TYPE | RECHARGE | STRAIGHT | DISCOUNT 1 | DISCOUNT 1 | ... | DISCOUNT N |
|---|---|---|---|---|---|---|
| CASH CARD A | FEE 700 | FEE 230 | 0.25 | 0.54 | ... | 0.30 |
| CASH CARD B | FEE 702 | FEE 230 | 0.42 | 0.28 | ... | 0.24 |
| ... | ... | ... | ... | ... | ... | ... |
| CASH CARD N | FEE 721 | FEE 293 | 0.11 | 0.36 | ... | 0.26 |
| CREDIT CARD A | FEE 721 | FEE 405 | 0.29 | 0.39 | ... | 0.44 |
| CREDIT CARD B | FEE 725 | FEE 463 | 0.22 | 0.26 | ... | 0.43 |
| ... | ... | ... | ... | ... | ... | ... |
| CREDIT CARD N | FEE 721 | FEE 483 | 0.37 | 0.30 | ... | 0.20 |
| SMART CARD A | FEE 721 | FEE 484 | 0.25 | 0.30 | ... | 0.25 |
| SMART CARD B | FEE 720 | FEE 485 | 0.27 | 0.21 | ... | 0.22 |
| ... | ... | ... | ... | ... | ... | ... |
| SMART CARD N | FEE 705 | FEE 490 | 0.19 | 0.20 | ... | 0.23 |
| RECEIPT A | FEE 797 | FEE 532 | 0.30 | 0.17 | ... | 0.24 |
| RECEIPT B | FEE 777 | FEE 533 | 0.23 | 0.12 | ... | 0.27 |
| ... | ... | ... | ... | ... | ... | ... |
| RECEIPT N | ... | FEE 541 | 0.22 | 0.14 | ... | 0.26 |
| ... | ... | ... | ... | ... | ... | ... |

DISCOUNTING PURCHASE
700

| TOKEN TYPE | TIME PERIOD | DISCOUNT LEVELS | LOCATION | PRODUCT TYPE | AD IDENTIFIER | STRAIGHT |
|---|---|---|---|---|---|---|
| CASH CARD A | 1:37 | 10, 100, 1000 | STORE A | ELECTRONICS | JINGLE | FEE 230 |
| ... | ... | ... | ... | ... | ... | ... |
| SMART CARD B | 13:37 | 10, 20, 100 | STORE B | FOOD | LOGO | FEE 485 |
| ... | ... | ... | ... | ... | ... | ... |
| RECEIPT A | 202:01 | 10, 100, 3000 | STORE B | DRUGS | STORY | FEE 532 |
| ... | ... | ... | ... | ... | ... | ... |
| RECEIPT N | 100:37 | 10, 100, 1000 | STORE N | ENTERTAINMENT | PASSWORD | FEE 541 |
| ... | ... | ... | ... | ... | ... | ... |

FIG. 7

MULTIPLE DENOMINATION CURRENCY RECEIVING AND PREPAID CARD DISPENSING METHOD AND APPARATUS

CROSS REFERENCE TO RELATED APPLICATIONS

This is non-provisional application is based on the provisional patent application Serial No. 60/295,439 to David Knox et al., for "Method and System for Issuing a Token Based on Two or More Denominations of Currency" filed Jun. 1, 2001, which is commonly assigned herewith to DataWave Systems Inc, and is incorporated hereinto in its entirety by reference.

BACKGROUND OF THE INVENTION

1. Field of the Invention

This invention generally relates to the field of automatic teller machines and credit card machines and more particularly to the machines and methods for processing various types and various denominations of currency including cash, bills, and prepaid, credit, check, debit and smart cards.

2. Description of the Related Art

In the late 1970s and early 1980s Automatic Teller Machines or ATMs began appearing in many major banks. As the name implies, an "automatic teller" handles most of the banking transactions of it's human teller counterpart. The transactions include dispensing cash, transferring money, taking payments and issuing cash advances. Typical ATM machines available today provide a variety of functions and capabilities including the ability to perform cash withdrawals, fund transfers, balance inquiries, receipts of transactions printed, electronic journaling both locally and to remote servers for redundant data recovery and storage, advanced graphics support such as high resolution color screens, secured and tamper-resistant packaging, and multilingual support in English, Spanish and French. One ATM available is the Tidel IS-1000 ATM as described at online URL (www.atmfinancial.com).

Unlike its human teller counterpart, the ATM provides teller services tirelessly and continuously 24 hours a day, every day of the year. But, nearly 30 years later, the ATM is still not much more than a cash dispenser. In fact, with hundreds of thousands of ATMs installed in the U.S., research shows nearly half provide only cash dispensing transactions. And, only five percent of the remaining ATMs do anything more than the original, basic banking transactions.

In addition to the basic functions of a teller, consumers are demanding more twenty-four hour services from their local banks. One such service is the CoinBank® from CoinBank Automated Systems Inc., a subsidiary of Cash Technologies. CoinBank is a line of self-service coin deposit machines for banking and retail establishments. The CoinBank machine counts coins precisely by electronically evaluating the metal content of the coins and is programmable for most countries' currency. The CoinBank system incorporates debris-handling features that are essential for reliable self-service operation. For more information see online URL (www.cashtechnologies.com).

Along with ATMs and self-service coin deposit machines, another area of technology for financial transactions that continues to grow is smart cards. During the early years of smart card development it became evident that the "lure" of the smart card was its ease of use coupled with security. Smart cards were to be used for debit cards, credit cards, IEP (intersector electronic purse) cards, and telephone cards.

The fundamental idea of the smart card was to have a device into which the user could "load" money, and use this stored money to purchase items from merchants who have the proper electronic payment system installed. Companies such as Microsoft, HP, and other European hardware companies have, together, begun to develop standards that would allow smart cards, readers, and personal computers to interact, regardless of the manufacturer. Using these smart cards in concert with personal computers and the Internet, consumers are able to complete financial transactions over the Internet.

Today, with significant technological progress made by the semiconductor industry in terms of memory capacity and the design of the microprocessors, it is possible to store vast amounts of data on smart cards. This, in combination with the drop in cost, due to mass production, has considerably widened the field of applications and has dramatically increased the market demand. Smart cards are used not only in the financial industry but in healthcare, transportation and telecommunications.

The increased popularity of 24-hour banking services along with the advantages of carrying less cash through use of smart cards has not been without its shortcomings. One shortcoming is the handling of different types of currency at ATM machines. Often the counting and verifications of coin deposits using ATMs does not happen until a human teller or human operator verifies an envelope deposit by hand. The CoinBank system described above from Cash Technologies Inc., eliminates the requirement to hand tally coin deposits for ATM deposits. Although the elimination of hand tallying for coins is useful, there is still a problem with the cost of handling coins and bills by financial institutions. Moreover, the difficulty of handling different denominations of currency such as pennies, nickels, dimes, quarters, half-dollars and dollars can vary widely depending on such factors as: (i) how commonly circulated the denomination of coin is, e.g. half-dollars and dollars are used less frequently than quarters and dimes; (ii) how heavy the coins are because the cost to transport heavier the coins is more than the cost to transport lighter coins; (iii) percentage of counterfeit coins of a particular denomination in circulation; and more. Accordingly, a need exists for a method and system to account for the difficulty of handling currency of different denominations of currencies.

Still another problem with handling coins and bills at ATMs and self-service coin deposit machines is the problem of multiple sources of currency. For example, often it is easier for a financial institution such as a bank to take money electronically from a bank card or from a credit card or from a check card or from a debit card than it is from cash such as bills and coins. The labor involved in counting, managing, storing, tracing and securing the cash is often greater than those incurred using electronic transfers from the card holders account. This is especially true when the cardholder has a card from the financial institution such as a bank where the consumer is using the card. Furthermore, it is not uncommon for one credit card merchant, to charge a different fee than another credit merchant. For example, it is well known that American Express® brand cards charge a different rate to vendors using their brand cards than Master-Card® and Visa® Brand cards. Today there is no mechanism to differentiate the charge back to consumers when using different types of currency, such as cash card A from a credit card B. Accordingly, a need exists for a method and system to overcome this problem of handling multiple sources of currency, where there are differing difficulties depending on the currency.

Yet still another problem with handling coins, bills and plastic cards such as cash cards, credit cards, checking cards, debit cards and smart cards at ATMs and self-service coin deposit machines is providing incentives for subsequent purchases. Most businesses use techniques to increase sale of their own goods and services by marketing store branded credit cards and ATMs to their customers. Research has shown that consumers tend to purchase more when store brand cards are used. The deployment of ATMs to enable easy access to cash has also been shown to increase sales in stores with ATMs located inside or near by. However, there is no mechanism today to provide incentives to customers for making subsequent purchases using a specific card versus just any credit (or cash, debit, check or smart card) when replenishing or transferring money to a card. Accordingly, a need exists to overcome this problem as well.

Yet, still another problem with many sources of non-cashed based currencies such as credit cards, debit cards, check cards and smart cards is the loss of anonymity. Many times for certain purchases, consumers do not want their identity to be known. Privacy is especially a concern for certain types of purchase such as pharmaceuticals, payment of fines and other matters which consumers prefer to remain anonymous. Consumers often use cash in such transaction to avoid being tracked by a marketing database linked to a non-cash based transaction. Consumers fear that the consumers' purchasing habits are being tracked without their consent. Accordingly, a need exist to over come the problem with maintaining anonymity for goods and services without using case.

What is needed is a method and system to overcome the problems with the prior art and to provide a system to handle currency of different denominations and to base fees on the type of currency handled. Preferably, the system is needed to handle multiple sources of currencies such as cash (including bills and coins), cash cards, debit cards, check cards, credit cards and smart cards, while charging different usage rates. Moreover, ideally the system would provide incentives for using certain types of currency by providing incentives to the consumer. Further, the method and system should allow a consumer to maintain privacy as desired by the consumer.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 4 is a table showing an exemplary fee structure for different types of currencies received, according to the present invention.

FIG. 5 is a table showing an exemplary fee structure for different types of tokens issued, according to the present invention.

FIG. 7 is a table showing an exemplary discounting of a subsequent purchase of a good or service depending on the token received or the token used, according to the present invention.

DETAILED DESCRIPTION OF EMBODIMENTS

It is important to note, that these embodiments are only examples of the many advantageous uses of the innovative teachings herein. In general, statements made in the specification of the present application do not necessarily limit any of the equivalent and various claimed inventions. Moreover, some statements may apply to some inventive features but not to others. In general, unless otherwise indicated, singular elements may be in the plural and visa versa with no loss of generality.

Block Diagram of Automatic Currency Processor in a Network

Figure 1:
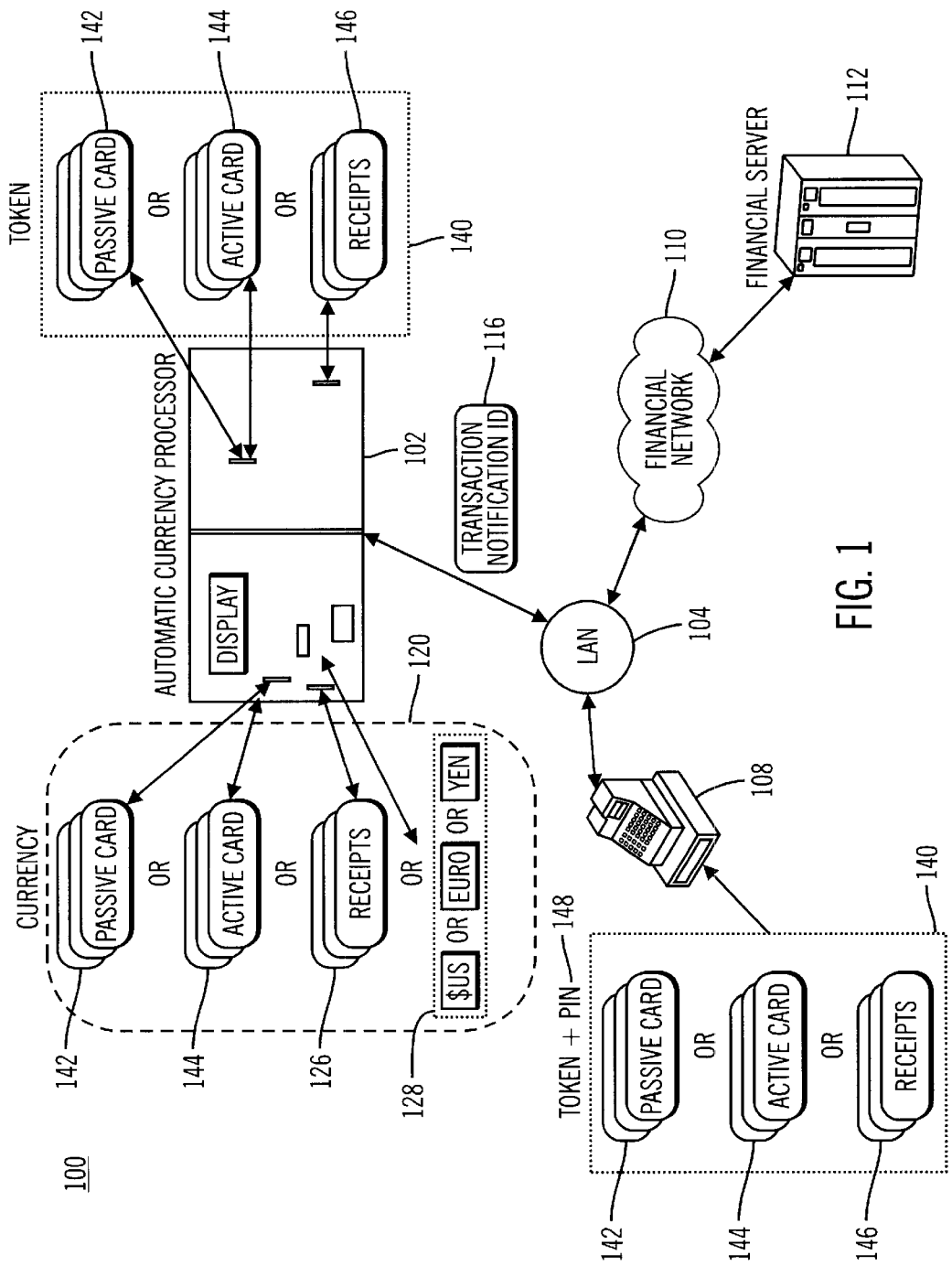
FIG. 1 is a functional diagram of the automatic currency processor in a network with a point-of-sale (POS) terminal and financial network, according to the present invention.

Turning to the figures where like references are referred to throughout several drawings, FIG. 1 is a functional diagram 100 of the automatic currency processor 102 coupled to a local area network 104, a point-of-sale (POS) terminal 108 and financial network 110, according to the present invention. The transaction begins when a consumer places currency 120 in the automatic currency processor 102. As shown, currency 120 is any physical item that can be circulated as a medium of exchange and common article for bartering including printed receipts 126, passive cards 142, active cards 144 and cash 128 including foreign and domestic notes and coins. Any combination of the currency 120 is placed into the automatic currency processor 102. As is explained in more detail below, the automatic currency processor 102 tallies both the types of currencies received and the corresponding amount of each type of currency received.

To help distinguish between two types of cards, the terms "passive card" and "active card" are used. The term "passive card" refers to any type of card such as a prepaid card using a passive type of memory, such as a simple recording strip. The information on the passive card is not meant to change after the card is issued. Simple passive cards include cash cards, debit cards, prepaid cards, and prepaid telephone cards. In fact, the standardization of passive cards in the telecommunications industry is so common that it is now possible to purchase prepaid long distance cards in many checkout lines of supermarkets and convenience stores.

In contrast, the term "active card" is used to define cards where the memory can change after a transaction. For example, the amount of available funds is updated after each use of the card. The information on the active card is meant to change after the card is issued.

The term credit card, which is a form of passive card, as used in the present invention includes cards that authorize a purchase of a good or service such as the popular cards including VISA®, MasterCard® and American Express®. The basic premise of credit cards are the same where a consumer can charge up to their predetermined credit limit for the purchase of goods and services. For balances not generally paid off within a monthly period, an interest charge is levied. In addition, other types of credit cards are now available such as secured or collateralized credit cards. A collateralized credit card is a type of credit card that is secured with some form of collateral, like a bank CD, or bank deposit. With these cards, the amount of credit a consumer secures depends on the amount of collateral deposited.

Returning to the description of the automatic currency processor 102, a consumer may wish to purchase an active card by inserting cash into an automatic currency processor 102. The terminal display 218 provides a menu that allows the consumer to choose an option to purchase an active card using cash. The terminal display 218 notifies the consumer that the transaction requires a minimum purchase price, such as $10.00. Next, the consumer is prompted by the terminal display 218 to select a desired value for the card. As an illustration of this embodiment, the user may wish to purchase an active card worth $50.00. Finally, after prompting the consumer to select a multi-digit activation number or PIN (personal identification number), the automatic currency processor 102 dispenses the active card 144 along with a receipt 146 containing information such as location, terminal ID, date, time, card purchase amount, card value, expiration date of card, and an 800 customer service number. The card could then be used to purchase consumer goods at locations where other active or passive cards are accepted. No limit is placed on the number of times the card can be used. The value of the dispensed card would be equal to the amount of cash input by the consumer minus any fee(s) charged by the automatic currency processor 102. For example, if the consumer input $50.00 in cash and the transaction had a corresponding straight fee of $1.00, then the dispensed card could be used to purchase up to $49.00 worth of consumer goods.

In another embodiment, the currency 120 including both the type received and the amount of each type received has a different transaction fee associated with it. For example, if the consumer places cash 128 such as coins in the automatic currency processor 102, a first rate is charged to accept coins (7% for example). Alternately, if the consumer places a different type of cash 128 such as paper notes in the automatic currency processor 102, then a second type of fee is charged (4% for example). Furthermore, if the quantity of coins in the deposit of cash 128 is substantial, a higher transaction fee may be charged than with a smaller quantity of coins. Likewise, if the amount of money credited to or replenishing one type of passive card such as a cash card is large a smaller transaction fee may be charged as compared with a smaller amount of money being charged to the same card. Different transaction fees for each type of receivable currency 120 may be assessed.

The consumer then chooses a type of token 140 to receive for the currency deposited into the automatic currency processing machines 102. A token 140, like currency 120 is any physical item that can be circulated as a medium of exchange and common article for bartering including printed receipts 146, passive cards 142 and active cards 144. Unlike currency 120, a token 140 does not necessarily include cash 128 e.g., bills and coins. As is described in more detail below, in one embodiment, the amount on the token 140 received is dependent on the type and amount of the currency 120 received. In another embodiment, the amount on the token received is also dependent on the type of token selected by the user. Yet in still another embodiment, the amount on the token 140 received is directly related to the type and amount of each type of currency 120 received along with the amount and type of tokens 140 printed as in the case of a receipt token 146, dispensed in the case of credit (debit, check, cash) cards 142, or credited in the case of a active card token 144. For convenience, when tokens 140 are taken from the automatic currency processor 102 whether a newly printed receipt 146, or newly issued passive card 142 or active card 144 and/or credit is placed (or replaced) onto a customer's preexisting passive cards (debit, check, cash) 142 or active card 144, this process is referred to in this present invention as "dispensing" or "receiving" the token or tokens or just "tokens received 140."

When the consumer receives the token or tokens 140, after his/her currency 120 deposit is made, an electronic transaction notification ID 116 is sent over the LAN 104 to the financial network 110 to a financial server 112. The transaction notification may include the amount and type of each currency received as well as the amount and type of tokens received.

The term network used in the present invention in the case of a LAN 104 or financial network 110 is any wired, wireless or broadcast connection between two or more information processing systems that includes the Internet, Intranets, WANs, POTS, cellular, satellite and other communication networks.

The term financial institution 112 as used in the present invention includes any entity or company able to reconcile financial transactions including consumer and commercial banks, lending institutions, currency exchange institutions, credit card companies and electronic transactions processing companies, such as DataWave Inc.

The term receipts 126 and 146 as used in the present invention means any printed item such as a transaction receipt similar to receipts commonly received from a cash register. The printed item does not have to be limited to paper and other materials such as plastics, rubber, and other natural and synthetic materials capable of being printed or otherwise marked. It should be understood that the receipt 126 and receipt 146 are not necessarily identical. One receipt is used as an input e.g., receipt 126 and the other receipt 146 is used as an output.

The tokens received 140 are then redeemable at a POS (point-of-sale) terminal 108 or alternatively by the automatic currency processor. In one embodiment a PIN 148 (personal identification number) is required along with the token 140 redeemed. The use of the PIN 148 is important for tokens received 140 such as printed receipts 146 that may be fraudulent. A PIN 148 along with a unique transaction ID 116 reduces the possibility of fraudulent receipts.

Block Diagram of the Automatic Currency Processor

Figure 2:
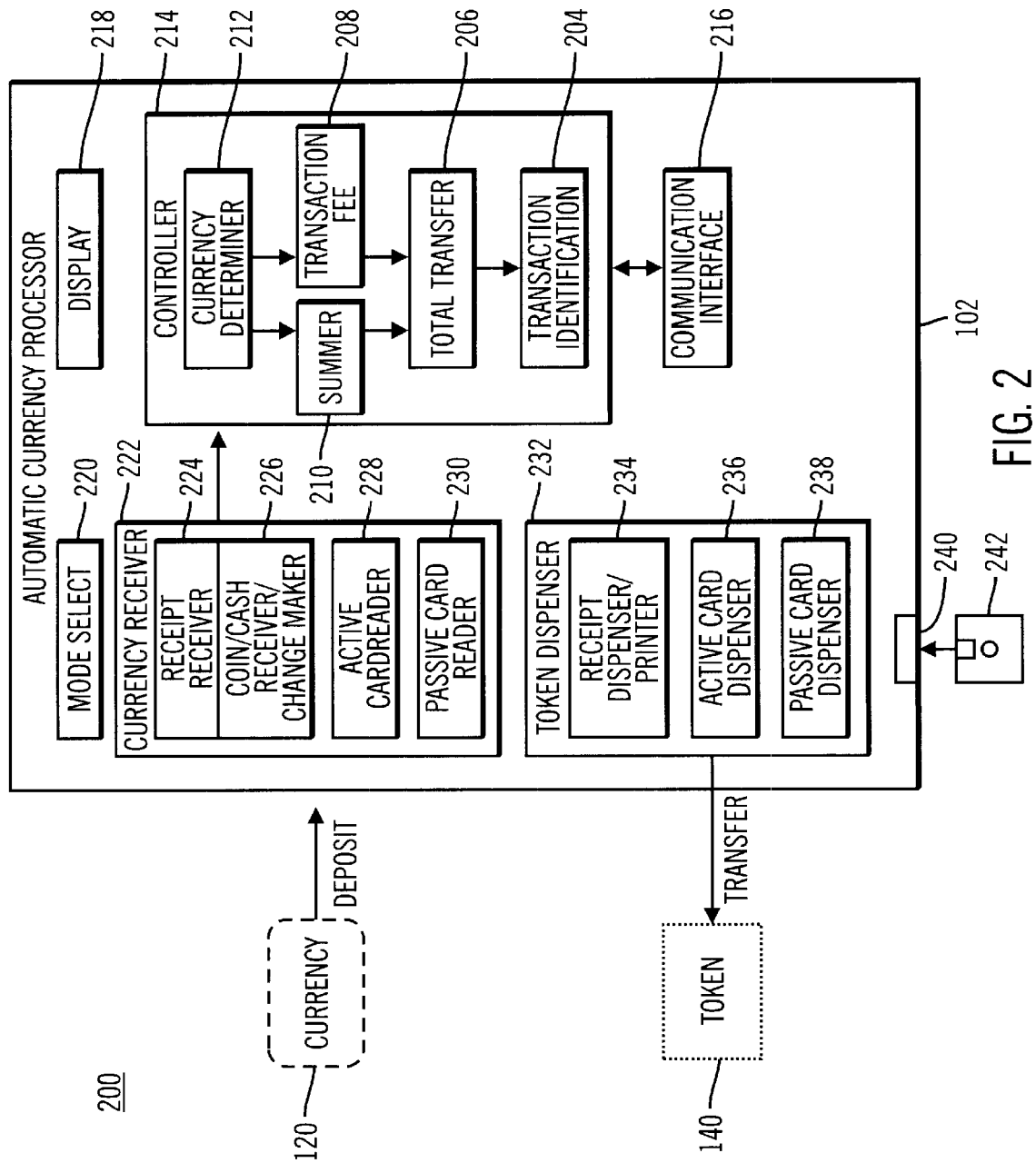
FIG. 2 is a block diagram of the major components of the automatic currency processor according to the present invention.

Referring to FIG. 2, there is shown a block diagram 200 of the major electronic components of the automatic currency processor 102 according to the present invention. The electronic components include: a controller 214, a network communications interface 216 for interfacing with LAN 104; and a display 218. The display 218 is any monochrome or color character or graphics display such as an LED, LCD, or other flat panel device. Storage such as RAM, ROM or a hard drive (not shown) may also be included. These are representative components of most information processing systems such as a computer and other microprocessor-based systems. The general operation of an information processing system comprising these elements is well understood by those familiar with the art. The controller 214 may be implemented by combination of hardware and software. Moreover, the functionality required for using the invention may be embodied in computer-readable media (such as 3.5 inch diskette) 242 to be used in programming via computer readable interface 240 to enable an automatic currency processor 102 to perform in accordance with the invention.

A mode select switch 220 is used to receive user input regarding various user selections and responses to audio (not shown) and display 218 prompts. Two major groups of input/output devices are currency readers 222 and token dispensers 232. The currency readers include receipt receiver 224, coin cash receiver and change maker 226, active card reader 228, and passive card reader 230. It is important to note that many of these devices can be combined to perform more than one function and that they are shown here as separate devices for convenience. For example, commercially available card readers 230 such as those available from DieBold of North Cayton Ohio (See online URL www.diebold.com) exists for reading passive cards 142, and active cards 144. In addition, single International Standards Organization (ISO 7816) compliant active or smart card readers 228 and smart card writer (or dispenser) 236 are available from Litronic of Irvine Calif. See online URL (www.litronic.com/solutions/smartcard_readers.html). The receipt receiver 224, is an optical and/or magnetic scanner used for reading preprinted receipts, coupons and alike. The receipt dispenser 234 is a printer of receipts and coupons. In one embodiment, the receipts are printed using a ruggedized thermal printers, such as those available for ATMs.

The major components of the controller 214 include a currency determiner 212 which is coupled to the currency reader 222. Once the type of currency is determined, a summer 210 is used to tally the total type of a given currency. For example there may be X of currency A and/or Y of currency B. As described further below a transaction fee 208 is associated with each type and/or amount of currency 120 received during a deposit and/or the type or types of tokens 140 dispensed. Using a transaction fee T1 for currency A and a transaction fee T2 for currency B, where X equals the amount of currency A and Y equals the amount of currency B, the resulting total transferred to the token is calculated as (X−T1)+(Y−T2) or for j=1 through n amounts of different currencies received each with a unique transaction fee Ti with i running from 1 to m. The resulting mathematical statement is:

$\Sigma(j-Ti)$ where j=1 through n amounts and i=1 through m fees.

For example, a user might deposit one-hundred dollars in U.S. Bills (currency A) and ten dollars in U.S. Coins (currency B). The corresponding transaction fees might be four dollars for the bills (T1) and seventy cents for the coins (T2), which results in a total of four dollars and seventy cents in fees on the total deposit of one-hundred ten dollars. Thus the total net transfer to the token would be one-hundred six dollars and thirty cents.

The amount of the total deposit 210 is calculated as a sum of each of the types and denominations of the currency deposited. An arithmetic adder such as summer 210, carries out the total transfer 206 in one embodiment. The total transfer 206 to be transferred to a token 140 is based upon the sum of each currency received less the fee calculated in the transaction fee 208 to a token. The unit labeled transaction identification 204 generates a unique transaction ID 16 for the transaction. In one embodiment, the transaction ID 116 includes the location of the automatic currency processor 102, an identifier such as a serial number for the automatic currency processor 102, the date and the time of the transaction, a sequence number of this transaction, the total amount deposited and the type and amount of each currency received, the total amount transferred including the amount of each currency received, whether a new token has been dispensed or a preexisting token recharged, the transaction fee calculated for the transaction, the expiration data of the token used (if any), the expiration of the currency used (if any), terms and conditions for using the token and more.

Typically the automatic currency processor 102 is strategically located in stores near the entry/exit doors. As a consumers enter or exits the store they can pass by the automatic currency processor 102 which affords them the opportunity to deposit any loose change they may have accumulated and convert it into a token.

Currency Processing Flow

Figure 3:
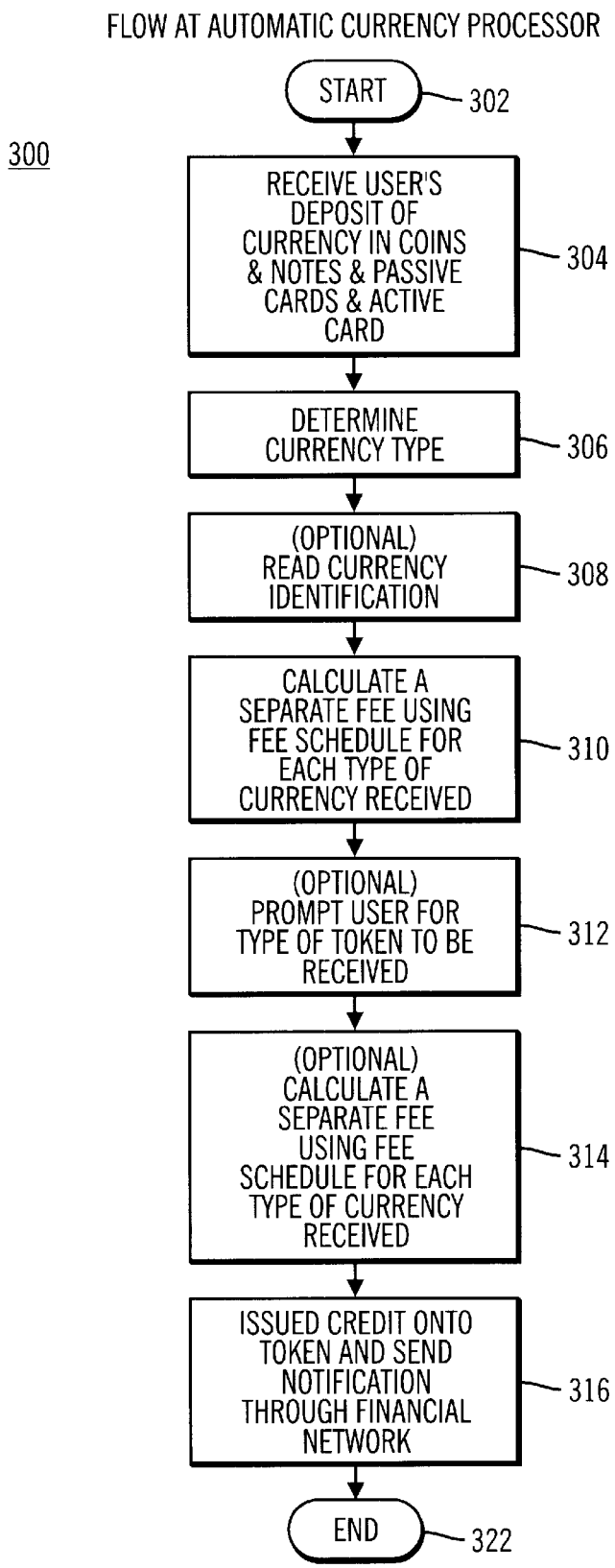
FIG. 3 is a flow diagram of the currency processing on the automatic currency processor of FIG. 2, according to the present invention.

Turning now to FIG. 3, shown is a flow diagram 300 of the currency processing on the automatic currency processor 102 of FIG. 2, according to the present invention. The process begins when a consumer places a deposit into the automatic currency processing system 102, step 304. As described above currency 120 is any physical item that can be circulated as a medium of exchange and common article for bartering including printed receipts 126, passive cards 142 (debit, credit, cash), active cards 144 and cash 128 including foreign and domestic notes and coins. The currency determiner 212, in step 306, determines the currency type. The currency determiner 212 is electrically coupled to the currency receiver 222 so that each currency receiver type 224–230 provides a unique signal.

Optionally, the currency identification is also read in from the currency receiver 222, step 308. For example, if the currency is cash, the type such as the country of origin is identified. Similarly, for a currency type of passive card, the brand of card such as DataWave, AMEX®, VISA®, MASTERCARD®, DINERSCLUB® or equivalent is determined. Moreover, if the currency has a unique identifier on it, such as a serial number or customer number, this is also read to provide a tracking history in the transaction notification ID 116 per user back to the financial server 112.

Discount Based Upon Fee Schedule for each Type of Currency

In one embodiment, in step 310, a separate transaction fee using a fee schedule for each type of currency received is calculated. Turning to FIG. 4A, shown is an exemplary base fee schedule for deposit transaction fees. It is important to point out that the transaction fees can be grouped by major categories such as bills versus coins versus passive cards versus active cards. Stated differently, a different fee for each type of currency is determined from the table 400. As an example the fee 420 for US Bills is "FEE 100" and is different than the fee 424 for cash card A which is "FEE 200." Moreover, the fee 420 for US Bills, "FEE 100," is different than the fee 422 for US coins which is "FEE 105". In other words, suppose a user wants to transfer one-hundred dollars to a debit card. If the user deposits the total amount in coins the fee might be seven dollars, whereas if the user inserts a credit card the fee might only be one dollar. In general each fee in FIG. 4 is denoted as "Fee nnn", where nnn is a number that represents a predetermined fee.

Discounts Based Upon the Amount of Currency Deposited

In this embodiment, the fee charged for each type of currency deposited is discounted depending on other factors like the amount of a certain type of currency deposited. Stated differently, the deposit of five dollars (fee=$0.35) in quarters may be assigned a higher transaction fee rate than the deposit of 10 dollars (fee=$0.60) worth of quarters. In either case, the amount transferred to the token will equal the amount of the deposit minus the corresponding transaction fee. Accordingly, discounts for volumes of a currency type 402 may be applied. Shown are N levels of discounts 406, 408 and 410 depending on the volume or amount of a currency type received. For example, if the type of currency 120 deposited is U.S. One Dollar Bills and the amount of the deposit is twenty dollars or less, then the total fee would be FEE 100. On the other hand, if the amount deposited is greater than twenty dollars and not more than one-hundred dollars the total fee would be FEE 100 minus $0.10, where $0.10 is the amount of DISCOUNT2 408. Furthermore, if the amount deposited is greater than one-hundred dollars the total fee would be FEE 100 minus $0.25, where $0.25 is the amount of DISCOUNT1 406. It should be understood that although the discounts shown 406, 408 and 410 are "subtracted" from the fee calculated, it is within the true scope and spirit of the present invention to use other discounting mechanisms as well such as "multiplying" the fee calculated by a discount percentage.

Discounts Based Upon the Type of Token Dispensed

In this embodiment, in step 312, the user is optionally prompted on display 218 for the type of token to be received 140. This step is optional because in another embodiment, the automatic currency processor 102 may sense the token type inserted in the automatic currency processor to be re-charged e.g. more money added. Alternatively, only one type of token may be dispensed on some machines. The consumer may for example, use any type of currency to charge a debit card and even the use of one debit card to transfer money to another debit card is possible. Accordingly any combination of currency 120 can be used to receive a selected token 140 or selected tokens.

Different types of exemplary fee structures for different types of tokens issued, according to the present invention, are shown in FIG. 5. In one embodiment, the fee structure is based upon the type of token to be received. Notice in column 502 that credit card A 520 has a fee of "Fee 700" when a card is recharged and a straight fee of "Fee 230" is levied. Likewise, smart card B 522 has a recharge fee of "FEE 702" and a straight fee of "FEE 485" both of which are different than the fees levied for credit card A 520. For example, a recharge fee on "credit card A" might be fifty cents, whereas the straight fee would be one dollar. Similarly, receipt A may have a recharge fee and a straight fee, which are both equal to one dollar. Although fees are shown to be different for each type of card and the recharging of a token 140 versus issuing a new token, it is important to note that fees levied do not have to be unique and they are shown individually for clarity only.

Another type of fee structure includes the amount of money to be transferred to a token. This is shown in FIG. 5B represented by discount1 508 and discount 2 510 up through discount N 514 in FIG. 5B. For example, suppose a user wants to deposit a sum of money to be credited to credit card A. This transaction might have a recharge fee of one dollar. However, if the amount of the deposit is greater than twenty dollars and not more than one-hundred dollars, then the total fee would be reduced by an amount of $0.25, which is the amount of Discount 1 508. Similarly, if the deposit amount is greater than one-hundred dollars and not more than five-hundred dollars, the recharge fee of one dollar would be discounted by an even greater amount of $0.54, which is the amount of Discount 2 510. It is within the true scope and spirit of the present invention to use other discounting mechanisms as well such as "multiplying" the fee calculated by a discount percentage.

Next, in step 314, a calculated amount of money transferred to the passive card (debit, cash or bank) 142 or active card 144 or receipts 146. As described above, the amount transferred is based upon the amount of currency deposited less (i) fees determined during the receipt transaction of the currency and/or (ii) fees determined during receiving the token 140 and the process ends in step 322.

In step 316, a transaction notification ID 116 is sent back to the financial server 112. The notification contains on or more of the following:

Time and date of the transaction.

Location and identifier of the automatic currency processor.

Amounts and types of currency received.

Fees charged (if any) for receipt of each type of currency.

Fees charged (if any) for amounts and types of tokens dispensed.

Whether or not a token was dispensed or recharged.

Terms and Conditions for receiving additional discounts when redeemed at POS.

In another embodiment, the transaction notification ID 116 is also written to the token 140 to provide further tracking when the token is subsequently used at a POS 108.

The receipt may include the location of the automatic currency processor 102, an identifier such as a serial number for the automatic currency processor 102, the date and the time of the transaction, a sequence number of this transaction, the total amount deposited and the type and amount of each currency received, the total amount dispensed including the amount of each currency received, whether a new token has been dispensed or a preexisting token recharged, the transaction fee calculated for the transaction, the expiration data of the token used (if any), the expiration of the currency used (if any), terms and conditions for using the token and more.

In another embodiment, the automatic currency process has a volume threshold before currency 120 is received and/or a token 140 is dispensed. For example, the volume threshold may be set to $10 dollars as a minimum prior to currency being accepted. And there may be a $20 dollar minimum for new tokens that are dispensed or a $15 dollar minimum to recharge a preexisting token. One purpose of this threshold is to ensure that a minimum previously determined sum of a deposit of currency or dispensing of a token is above some minimum.

Embodiment of Redeeming Tokens at POS

Figure 6:
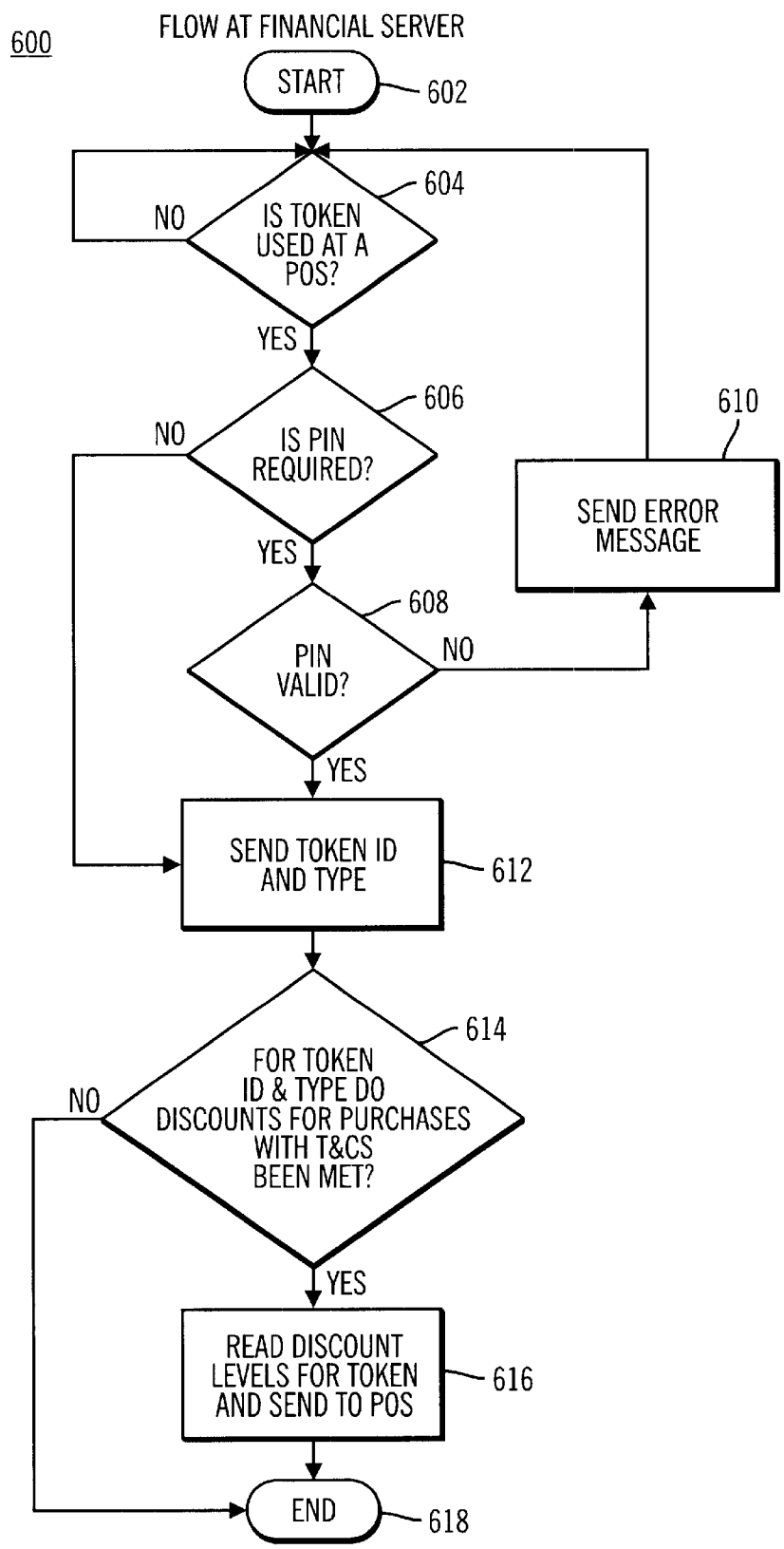
FIG. 6 is a flow diagram of the discounting of a subsequent purchase of a good or service depending on the token received as executed on the financial server, according to the present invention.

FIG. 6 is a flow diagram 600 of the discounting of a subsequent purchase of a good or service depending on the token 140 received as executed on the financial server 112, according to the present invention. The process begins in step 602 and a waits until a token is used at a POS 108, in step 604. If a PIN is required, step 606, a test is made to see if a valid PIN was entered, in step 608. If the PIN is not valid, an error message is sent back to the POS 108, in step 610, after which the process at the financial server 112 would resume waiting for a token to be used at a POS, in step 604. On the other hand, if the PIN is valid, the token type and ID, if any, will be received at the financial server 112, in step 612. Similarly, the process will receive the token type and ID, if any, at the financial server 112, in step 612. In either case, the process will use the token ID and type to determine if any discounting should occur at the POS 108, in step 614. If discounting is warranted, in step 616, the process will read the discount levels for the token and send the corresponding information to the POS 108.

FIG. 7 is a table showing an exemplary discounting of a subsequent purchase of a good or service depending on the token received or the token used, according to the present invention. After identifying the token type 702, the process can search the table in FIG. 7 to determine if the token received qualifies for any discounts such as those indicated by discounts 704, 706, 708, 710, and 712. As an example, if the token received indicates that "SMART CARD B" is used in "STORE B" to purchase "FOOD" then the appropriate discount would be computed and returned to POS 108. Similarly, if Receipt A is used at a POS 108, the process will determine if the token qualifies for any discounts.

For example, if the token is being used at Store B within the required time period to purchase drugs, the process will compute the total discount and transmit the information back to the POS 108.

The discounting from the straight transaction fees 404 and 506 in one embodiment is capped to the amount of the transaction fees themselves assessed by the automatic currency processor deposit. This enables retailers using the automatic currency processor 102 in their stores to provide incentives by waiving the straight transaction fees. For example, a retailer can provide incentives for using the token inside the store on the same day of a deposit made at the automatic currency processor. In another embodiment, the straight transaction fee 404 and 506 is not capped to the transaction fees themselves. This enables retailers using the automatic currency processor 102 in their stores to provide incentives beyond waiving the straight transaction fees. For example, a retailer can provide additional incentives for certain types of transactions such as converting cash as currency 120 to a token such as a store branded card for use inside the store on the same day. In this example, the retailer may want to provide a bonus of five-dollars towards any subsequent purchase. The retailer realizes through customer buying habits that the store credit of five-dollars ($5) on the store branded card results in consumer spending fifty dollars or more during the same day period. The retailer not only wants to waive their transaction fee for taking cash in this example but wants to provide the additional five-dollar incentive as well.

Coin Changer Embodiment

In this embodiment, the automatic currency processor 102 is used to provide change. The currency is preferably cash that the user deposits. Depending on whether the currency consists of coins or notes a deposit transaction fee may be levied. For example, if a one-dollar ($1.00) bill is deposited, many times it is more cost effective to get rid of coins such as quarters. Coins are harder to count than notes, coins are harder to manage and transport because of their weight. In this example four (4) quarters are dispensed as tokens. As an incentive to users to redeem notes (such as one-dollar bills) for coins no transaction fee may be levied where the machine holds an inventory of coins above a minimum predetermined threshold. Thus, a transaction fee is charged when one user deposits coins, while the coins are dispensed to a second user without a transaction fee, allowing retention of the transaction fee without the necessity to handle the coins.

On the other hand, if the user deposits the currency of four (4) quarters and requests a token, which is a one-dollar ($1.00) bill, the automatic currency processor 102 levies a fee. A fee such as 10% of the transaction amount would mean for the currency processor to accept coins as deposits for the dispensing of notes, the user would have to deposit $1.10 in coins to receive a one-dollar ($1.00) bill. Accordingly, in this embodiment, the automatic currency processor may or may not levy a transaction fee when change is provided depending on such variables of whether coins or notes are deposited or dispensed and the current inventory of coins or notes in the automatic currency processor.

Discussion of Hardware and Software Implementation Options

The present invention, as would be known to one familiar with the art could be produced in hardware or software, or in a combination of hardware and software. The system, or method, according to the inventive principles as disclosed in connection with the preferred embodiment, may be produced in a single computer system having separate elements for performing the individual functions or steps described or claimed or one or more elements combining the performance of any of the functions or steps disclosed or claimed, or may be arranged in a distributed computer system, interconnected by any suitable means as would be known by one familiar with the art.

According to the inventive principles as disclosed in connection with the preferred embodiment, the invention and the inventive principles are not limited to any particular kind of computer system but may be used with any general purpose computer, as would be known to one familiar with the art, arranged to perform the functions described and the method steps described. The operations of such a computer, as described above, may be according to a computer program contained on a medium for use in the operation or control of the computer, as would be known to one familiar with the art. The computer medium which may be used to hold or contain the computer program product, may be a fixture of the computer such as an embedded memory or may be on a transportable medium such as a disk, as would be known to one familiar with the art.

The invention is not limited to any particular computer program or logic or language, or instruction but may be practiced with any such suitable program, logic or language, or instructions as would be known to one familiar with the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Non-Limiting Examples Shown

Although a specific embodiment of the invention has been disclosed. It will be understood by those familiar with the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for processing currency of various denominations and corresponding values comprising the steps of:
   receiving currency of a first denomination with a first value at an automatic currency processor;
   assessing a first fee in response to the first denomination;
   receiving currency of a second denomination with a second value at the automatic currency processor; and
   assessing a second fee different from the first fee in response to the second denomination.

2. The method according to claim 1, wherein the first and the second denominations are selected from a group of currency consisting of notes, coins, passive cards, and active cards.

3. The method according to claim 1, wherein the first denomination corresponds to a metallic coin and the second denomination corresponds to a paper note and wherein the first rate is greater than the second rate.

4. The method according to claim 1, wherein the currency is issued by a single sovereign nation.

5. The method according to claim 1, further comprising the step of
determining a total deposit for a first transaction by adding the first value with the second value and then subtracting the first fee added with the second fee.

6. The method according to claim 5, wherein the method occurs within a remote automatic currency processor and the method further comprising the step of:
electronically transferring a transaction notification ID including the total deposit of the transaction to a financial server over a financial network external to the remote automatic currency processor.

7. The method according to claim 6, wherein the financial server includes a credit network for facilitating a credit charging transaction, the method further comprising the steps of:
receiving a charge value entered at the remote automatic currency processor;
assessing a third fee in response to the charge value; and
collecting the charge value using the credit network wherein,
the step of determining the total deposit further determines the total deposit by adding the charged value and subtracting the third fee.

8. The method according to claim 6, further comprising the steps of:
associating an identification signal with the transaction, the identification signal at least partially identifying the transaction; and
providing a token at the remote automatic currency processor having the identification signal.

9. The method according to claim 8, wherein a type of token provided further mathematically alters the amount of a total deposit calculated based upon the sum of the first and the second values and subtracting the first and second fees.

10. The method according to claim 9, wherein an amount of a type of token provided further mathematically alters the amount of a total deposit calculated.

11. The method according to claim 9, wherein whether a new token is dispensed or a user's preexisting token is recharged changes the amount of a total deposit calculated.

12. The method according to claim 11, wherein the token corresponds to a passive card having a magnetic stripe to generate the identification signal.

13. The method according to claim 12, wherein the remote automatic currency processor includes a passive card reader for reading the magnetic stripe, the method further comprising the steps of:
reading the magnetic stripe of a pre-existing passive card with the passive card reader and determining the identification signal in response thereto; and
wherein the step of associating associates the identification signal in response to the step of reading, and the token provided by the step of providing provides the pre-existing passive card.

14. The method according to claim 9, wherein the token corresponds to printed paper having the identification signal.

15. The method according to claim 9, wherein the token is an active card having the identification signal and at least a portion of the electronic funds transfer system is included within the active card.

16. The method according to claim 15, wherein the remote automatic currency processor includes an active card interface for interfacing with the smart card, the method further comprising the steps of;
interfacing with the active card and determining the identification signal in response thereto, wherein the step of associating associates the identification signal in response to the step of interfacing, and the token provided by the step of providing provides the pre-existing active card.

17. The method according to claim 8, wherein the token may be used to purchase goods or services at any of a plurality of points of purchase accepting currency in exchange for the goods or services, the method further comprising the step of
discounting a purchase of goods or services at a selected point of purchase of the plurality of points of purchase in response to the token being used to facilitate the purchase, thereby allowing a retailer with the remote automatic currency processor to discount purchases for its customers.

18. The method according to claim 17, wherein the step of discounting the purchase expires a predetermined time after the step of electronically transferring the transaction.

19. The method according to claim 17, wherein the step of discounting the purchase does not exceed the combination of the first and the second fees.

20. The method according to claim 1 wherein the first denomination corresponds to a metallic coin and the second denomination corresponds to a first paper note, the method further for exchanging metallic coins for paper notes and further comprising the steps of:
receiving a second paper note having a note value; and
dispensing a plurality of metallic coins having a total value equivalent to the note value wherein no fee is assessed in response to the steps of receiving the second paper note and dispensing the plurality of metallic coins.

21. The method according to claim 20 wherein
the step of dispensing the plurality of metallic coins dispenses at least one metallic coin received at the step of receiving currency of the first denomination and the first denomination corresponds to the at least one metallic coin, thereby receiving the at least one metallic coin and assessing a corresponding fee while dispensing the at least one metallic coin without a fee, allowing retention of the assessed fee even though the at least one metallic coin is no longer retained by the automatic currency processor.

22. A method for determining a transaction fee to convert a first form of payment deposited to second form of payment dispensed, where the transaction fee is charged for the conversion, the method comprising the steps of:
receiving a first form of payment deposited from a group of currency consisting of coins, notes, receipts, passive cards, and active cards;
dispensing a second form of payment dispensed from a group of tokens consisting of coins, notes, receipts, passive cards, and active cards;
calculating a transaction fee based upon one or more of the following:
at least one of the first form of payment received;
at least one of the amounts of the first form of payment received;
at least one of the second form of payment dispensed; and
at least one of the amounts of the second form of payment dispensed.

23. The method according to claim 22, wherein the step of calculating a transaction fee includes calculating a transaction fee based up whether a new token is dispensed or a user's token is recharged with a credit.

24. The method according to claim 22, wherein the step of calculating a transaction fee includes calculating a transaction fee equal to zero if the first form of payment received is notes and the second form of payment dispensed is coins.

25. A method on an information processing unit running as a financial server, the financial server coupled to a network connecting one or more automatic currency processors, the method for determining a transaction fee to convert a first form of payment to a second form of payment, where the transaction fee is charged for the conversion, the method comprising the steps of:
 receiving a notification of a first form of payment received at an automatic currency processor, the first form of payment selected from a group of currency consisting of currency consisting of coins, notes, receipts, passive cards, and active cards;
 receiving a notification of a second form of payment dispensed at an automatic currency processor, the second type of payment selected from a group of tokens consisting of coins, notes, receipts, passive cards, and active cards;
 calculating a transaction fee based upon one or more of the following:
  at least one of the first form of currency received;
  at least one of the amounts of the first form of currency received;
  at least one of the second form of token dispensed;
  at least one of the amounts of the second form of token dispensed;
  at least one type of subsequent purchase made using the second form of money; and
  at least one of the amounts of the second form of token used to make a subsequent purchase.

26. The method according to claim 25, wherein the step of calculating a transaction fee includes calculating a transaction fee based up whether a new token is dispensed or a user's token is recharged with a credit.

27. The method according to claim 25, wherein the step of calculating a transaction fee includes the sub-step of:
 discounting the transaction fee based upon a place where token is redeemed for subsequent purchase of a good or service.

28. The method according to claim 27, wherein the step of calculating a transaction fee includes the sub-step of:
 discounting the transaction fee based upon a time period where token is redeemed for subsequent purchase of a good or service.

29. An automatic currency processor comprising:
 a receiver for receiving currency of various denominations and values; and
 a controller for assessing a variable rate transaction fee in response to the denomination of the currency;
 a coin receiver for receiving currency of various coin denominations and values; and
 a note receiver for receiving currency of various note denominations, wherein the controller assesses a first fee received by the coin receiver and assesses a second fee received by the note receiver.

30. The automatic currency processor according to claim 29, wherein a transaction includes the reception of at least one denomination of currency, and the controller determines a total deposit by subtracting the assessed transaction fees from a total currency value received during the transaction, the automatic currency processor further comprising:
 a token dispenser for providing a token having an identification signal at least partially indicative of the transaction.

31. The automatic currency processor according to claim 30, wherein the token corresponds to printed paper having the identification signal.

32. The automatic currency processor according to claim 30, wherein the controller further mathematically alters the amount of the total deposit calculated based upon a the sum of a first value and a second value and subtracting the first fee and the second fee and a type of the token provided.

33. The automatic currency processor according to claim 30, further comprising
 a communication interface for electronically transferring the total deposit to a financial server external to the automatic currency processor.

34. The automatic currency processor according to claim 33, wherein the token corresponds to a passive card having a magnetic stripe having the identification signal.

35. The automatic currency processor according to claim 34, wherein the automatic currency processor further comprises
 a passive card reader for reading the magnetic stripe of a pre-existing passive card and determining the identification signal in response thereto, wherein the pre-existing passive card corresponds to the passive card having the identification signal.

36. The automatic currency processor according to claim 35, wherein the token is an active card having the identification signal and at least a portion of the financial server is included within the active card.

37. The automatic currency processor according to claim 35, wherein the controller further mathematically alters the amount of a total deposit calculated based upon the amount of the type of token provided.

38. The automatic currency processor according to claim 35, wherein the controller further mathematically alters the amount of total deposit calculated based upon whether a new token is dispensed or a user's preexisting token is recharged.

39. The automatic currency processor according to claim 34, further comprising:
 a mode selector for selecting either a token dispensing mode or a coin dispensing mode; and
 a coin dispenser for dispensing coins wherein the controller causes the coin dispenser to dispense a plurality of metallic coins having a total value equivalent to a note value received by the note receiver in response to the coin dispensing mode being selected and further wherein no transaction fee is assessed in response to the coin dispensing mode being selected.

40. The automatic currency processor according to claim 39, wherein the coin dispenser dispenses coins received by the coin receiver thereby receiving coins and assessing a transaction fee while dispensing the coins without assessing a transaction fee, allowing retention of the assessed transaction fees even though coins are no longer retained by the automatic currency processor.

41. A computer readable medium containing programming instructions for processing currency of various denominations and corresponding values, the programming instructions comprising:
 receiving currency of a first denomination with a first value at an automatic currency processor;
 assessing a first fee in response to the first denomination;
 receiving currency of a second denomination with a second value at the automatic currency processor; and
 assessing a second fee different from the first fee in response to the second denomination.

42. The computer readable medium according to claim 41, wherein the first and the second denominations are selected from a group of currency consisting of notes, coins, passive cards, and active cards.

43. The computer readable medium according to claim 41, wherein the first denomination corresponds to a metallic coin and the second denomination corresponds to a paper note and wherein the first rate is greater than the second rate.

44. The computer readable medium according to claim 41, wherein the currency is issued by a single sovereign nation.

45. The computer readable medium according to claim 41, further comprising the programming instructions of:
determining a total deposit for a first transaction by adding the first value with the second value and then subtracting the first fee added with the second fee.

46. A computer readable medium containing programming instructions for determining a transaction fee to convert a first form of payment deposited to second form of payment dispensed, where the transaction fee is charged for the conversion, the programming instructions comprising:
receiving a first form of payment deposited from a group of currency consisting of coins, notes, receipts, passive cards, and active cards;
dispensing a second form of payment dispensed from a group of tokens consisting of coins, notes, receipts, passive cards, and active cards;
calculating a transaction fee based upon one or more of the following:
at least one of the first form of payment received;
at least one of the amounts of the first form of payment received;
at least one of the second form of payment dispensed; and
at least one of the amounts of the second form of payment dispensed.

47. The computer readable medium according to claim 46, wherein the programming instructions of calculating a transaction fee includes calculating a transaction fee based up whether a new token is dispensed or a user's token is recharged with a credit.

48. The computer readable medium according to claim 46, wherein the programming instructions of calculating a transaction fee includes calculating a transaction fee equal to zero if the first form of payment received is notes and the second form of payment dispensed is coins.

* * * * *

UNITED STATES PATENT AND TRADEMARK OFFICE
CERTIFICATE OF CORRECTION

PATENT NO. : 6,659,259 B2
DATED : December 9, 2003
INVENTOR(S) : David Knox et al.

It is certified that error appears in the above-identified patent and that said Letters Patent is hereby corrected as shown below:

Column 13,
Line 40, from "preexisting" to -- pre-existing --

Column 16,
Line 6, from "a the" to -- the --

Column 18,
Line 16, from "up" to -- upon --

Signed and Sealed this

Sixth Day of April, 2004

JON W. DUDAS
*Acting Director of the United States Patent and Trademark Office*